No. 633,237. Patented Sept. 19, 1899.
J. EGBERT.
DEVICE FOR HOLDING TOWELS.
(Application filed July 22, 1899.)

(No Model.)

WITNESSES:
B. McComb.
Robert A. Williams

INVENTOR
John Egbert.
BY
Reques King
ATTORNEY

UNITED STATES PATENT OFFICE.

JOHN EGBERT, OF WEST NEW YORK, NEW JERSEY, ASSIGNOR OF ONE-THIRD TO CHARLES MANGELS, OF NEW YORK, N. Y.

DEVICE FOR HOLDING TOWELS.

SPECIFICATION forming part of Letters Patent No. 633,237, dated September 19, 1899.

Application filed July 22, 1899. Serial No. 724,786. (No model.)

*To all whom it may concern:*

Be it known that I, JOHN EGBERT, a citizen of the United States, and a resident of West New York, county of Hudson, and State of New Jersey, have invented certain new and useful Improvements in Devices for Holding Towels, &c., of which the following is a specification, reference being had to the accompanying drawings, forming a part thereof, in which similar letters of reference indicate corresponding parts.

My invention relates to an improved device for holding towels or fabric; and its object is to provide a cheap, substantial, and effective device for holding said towels in convenient positions on bar-room counters or wherever a towel may be desired. I attain this object by the apparatus illustrated in the accompanying drawings, in which—

Figure 1:
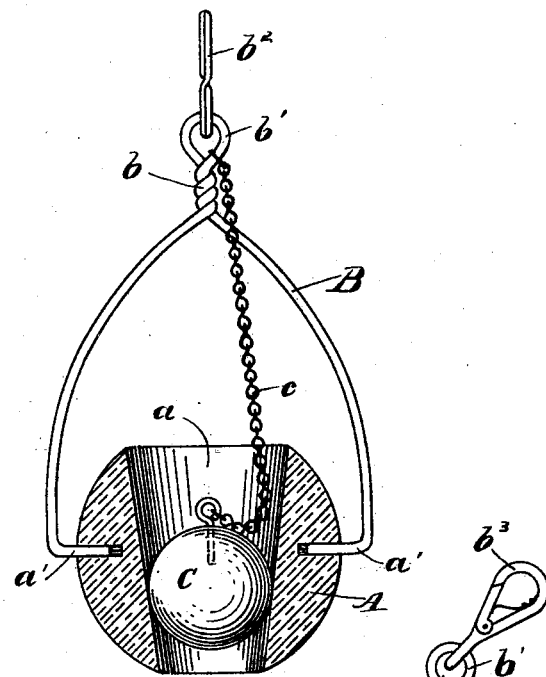
Figure 2:
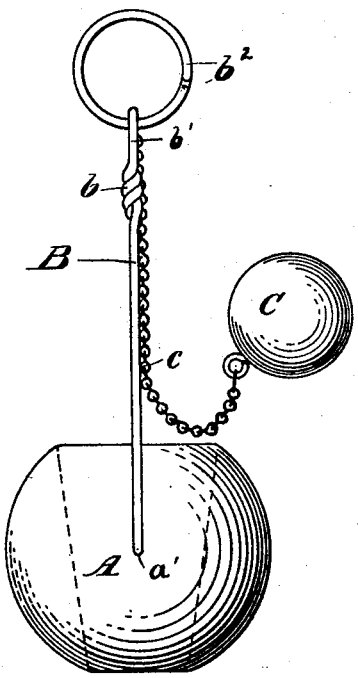
Figure 3:
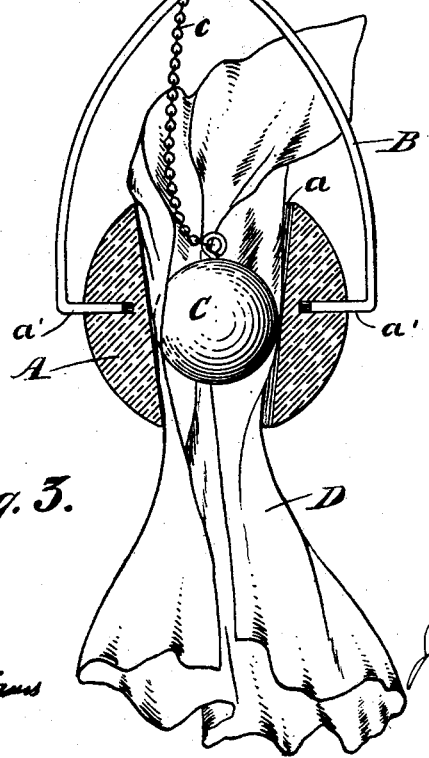

Figure 1 is a sectional view. Fig. 2 is a side view showing the secondary ball removed from the conical opening, and Fig. 3 is a sectional view showing the towel or fabric held in position in the device.

Similar letters refer to similar parts.

In the practice of my invention I mount a block A, partly spherical in shape and having a conical opening $a$, upon the two arms $a'$ of the hanging frame B.

The hanging frame B is preferably made of wire, twisted at $b$ and forming a ring $b'$ at its upper end. Mounted in this ring is an ordinary split key-ring $b^2$ for the purpose of attaching the device.

The ball C sets in the conical opening $a$ and is attached to a chain $c$, fastened to the frame B at $b'$.

The block A and ball C are preferably made of glass; but any other suitable material may be used.

Fig. 3 shows the towel or fabric D held in the conical opening $a$ by means of the ball C, the said ball C acting as a wedge after the towel is forced through said opening. It is obvious from the illustration that the towel cannot be withdrawn from the opening by downward motion unless the ball C is removed.

For use in bar-rooms small hooks or rings are provided at convenient points along the counter, and the device is fastened to the said rings or hooks by means of the split ring $b'$, the fastening $b^3$ being provided for private use, such as bath-rooms, toilets, &c.

Having thus described my invention, what I claim as new, and desire to secure by Letters Patent, is—

1. The combination of a towel-holding device, of a block partly spherical in shape revolubly mounted upon a hanging frame, a conical opening in said block, and a secondary ball adapted to engage in said conical opening and employed to securely hold the towel or fabric within said conical opening, substantially as described.

2. The combination of a towel or fabric holding device, of a glass block A provided with a conical opening $a$, a hanging frame B upon which the said glass block A is mounted, a secondary glass ball C adapted to engage in said conical opening $a$, a chain $c$ for fastening the said ball C to the aforesaid frame B, and means for connecting the device to any suitable hanger, substantially as described.

In testimony that I claim the foregoing as my invention I have signed my name, in presence of two witnesses, this 21st day of July, 1899.

JOHN EGBERT.

Witnesses:
B. McCOMB,
S. S. SEEGAR.